United States Patent [19]

Pommier

[11] Patent Number: 4,821,261
[45] Date of Patent: Apr. 11, 1989

[54] PACKET TRANSMISSION OF DIGITAL SIGNALS OVER A HIGH CAPACITY CHANNEL, PARTICULARLY OVER A SATELLITE BROADCASTING CHANNEL

[75] Inventor: Daniel Pommier, Breal-sous-Montfort, France

[73] Assignee: Etat Francais, Etablissement Public de Telediffusion, Montrouge, France

[21] Appl. No.: 890,475

[22] Filed: Jul. 30, 1986

[30] Foreign Application Priority Data

Jul. 30, 1985 [FR] France ................................. 85 11610

[51] Int. Cl.⁴ ............................................... H04J 3/02
[52] U.S. Cl. ......................................... 370/77; 370/20
[58] Field of Search .................... 370/20, 77, 19, 21, 370/112; 375/39, 54, 56

[56] References Cited

U.S. PATENT DOCUMENTS

| | | | |
|---|---|---|---|
| 3,666,890 | 5/1972 | Wade | 370/20 |
| 3,855,533 | 12/1974 | Schueli | 370/20 |
| 4,267,591 | 5/1981 | Wissel et al. | 370/20 |
| 4,347,616 | 8/1982 | Murakami | 370/20 |
| 4,661,945 | 4/1987 | Hirosaki | 370/20 |

Primary Examiner—Douglas W. Olms
Attorney, Agent, or Firm—Antonelli, Terry & Wands

[57] ABSTRACT

For full time transmission of digital signals, in the form of successive bits, over a satellite broadcasting channel, two multiplexes each having a bandwidth substantially half that of the channel are transmitted on two quadrature carriers, with four phase type modulation and with symbols offset on the two carriers. At reception one of the multiplexes is demodulated by phase demodulation, phase differential demodulation or phase coherent demodulation, with physical separation of one binary element out of two.

9 Claims, 4 Drawing Sheets

PACKET TRANSMISSION OF DIGITAL SIGNALS OVER A HIGH CAPACITY CHANNEL, PARTICULARLY OVER A SATELLITE BROADCASTING CHANNEL

BACKGROUND OF THE INVENTION

The invention relates to full time transmission of digital signals over a high capacity channel and it finds a particularly important application in transmission over channels having characteristics provided for direct broadcasting by satellite, at a carrier frequency of 12 GHZ allowing a digital flow rate of 20 Mbits per second.

Cable ground networks on the other hand only offer a passband of about 14 MHz, instead of the 27 MHz of a satellite channel, which means that full time multiplexing, if it has characteristics allowing transmission thereof over a cable network and reception with the same apparatus whatever the transmission channel, fails to fully use the satellite transmission capacity.

Satellite broadcasting in Europe will use the MAC/PACKET as described "The EBU C-MAC/PACKET system for Direct Broadcasting by Satellite" by H. Mertens et al in "links for the future" Science, Systems and Services for Communications, IEEE, Elsevier science Publisher BV, (Netherlands), 1984, pp. 3–8. This system is based on the sequential transmission of luminance and chrominance signals in analog form with time compression, and packet multiplexing for the sound and the data. Among the variations of MAC/PACKET, D2 MAC/PACKET uses, for the digital signals, a duobinary type modulation, with a passband compatible with that of ground cable networks, whereas C-MAC/PACKET uses 2-4 PSK coding for the digital signals, with a very wide pass band.

A description of the D2-MAC/PACKET may be found in French patent application No. 84 08727.

SUMMARY OF THE INVENTION

It is an object of the invention to provide a transmission method for receiving a full time D2 multiplex using the full capacity of a satellite transmission channel, while only requiring limited additions to the receivers provided for the D2-MAC/PACKET and keeping the advantages of the D2PACKET insofar as the possibility of transmission over the ground network is concerned.

With this aim in mind, the invention proposes more particularly a method for the full time transmission of digital signals, in the form of successive binary elements or bits, over a satellite broadcasting channel, characterized in that two multiplexed signals of a bandwidth half that of the channel are transmitted on two quadrature carriers, using four phase type modulation with bits offset on the two carriers, and in that at reception one of the multiplexed signals is subjected to frequency demodulation, phase differential demodulation or phase coherent demodulation, with physical separation of one binary element out of two.

At transmission, each multiplex, is typically subjected to precoding by transformation from state modulation into modulation by transition between states, so as to allow at reception the use of frequency or differential demodulation and so as to avoid phase ambiguity in the case of coherent demodulation. Such precoding may be independent with respect to each quadrature carrier or be effected between quadrature carriers, which seems to be the best solution when it is desired to use demodulation by frequency discrimination or phase differential demodulation.

The invention also provides for a receiver for recovering the signals of one of the two multiplexes and having, in addition to the D2-MAC/PACKET reception elements, a specific switchable assembly for substitution with a duo-binary demodulator belonging to the receiver, having a circuit for recovering the clock at a frequency double that of the binary elements of each channel and a counter for selecting one binary element out of two, initializable so as to allow selection of that one of the multiplexes which is to be applied to the D2-MAC/PACKET decoding circuits.

The invention will be better understood from the following description of particular embodiments given by way of examples which in no way is limiting of the invention.

Figure 1:
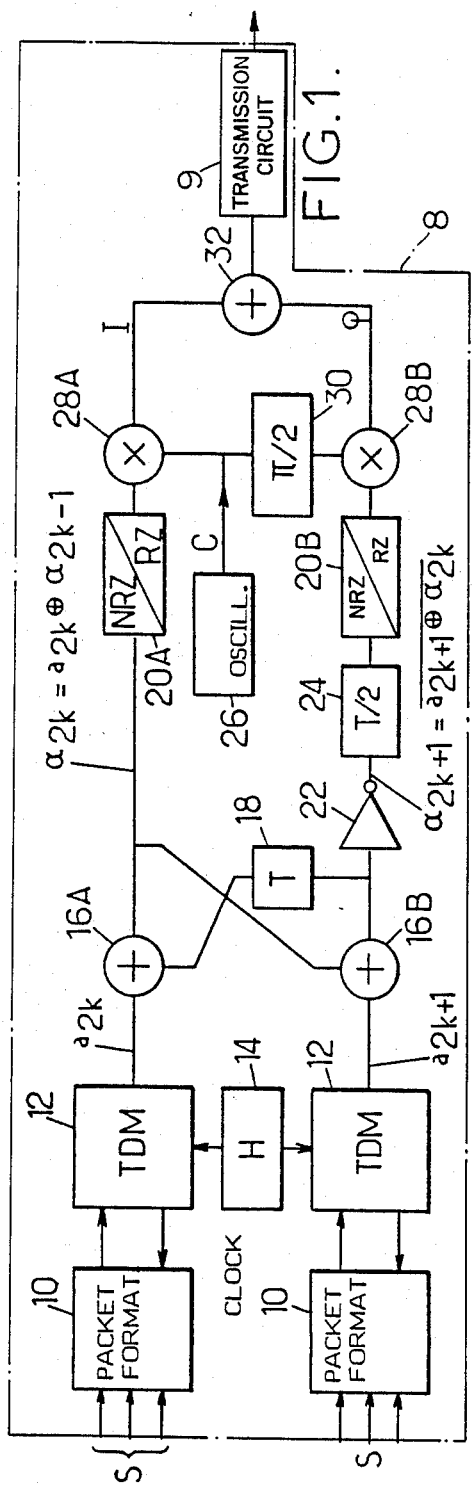
FIG. 1 is a block diagram of a transmission modulator delivering a PSK 2-4 modulated carrier transporting two D2-PACKET multiplexes over two quadrature components I and Q of the carrier.

The modulator shown in FIG. 1 is intended to be incorporated in a transmitter 8 for a satellite communication channel and to deliver a full time PSK 2-4 modulated carrier transporting two D2-PACKET multiplexes separable at the receiving end at the physical level, i.e. from the first layers of the standard ISO protocol by removal of one binary element out of two. It should be borne in mind that the term D2-PACKET only applies here to the formation of packets which will be used for modulating the carrier, while respecting the distribution of the signals specific to D2-MAC/PACKET, a description of which will be found in French patent application No. 84 08727 previously mentioned.

The two multiplexes are assembled in the same way: the sources S delivering the messages to be transmitted are connected to two conventional packet grouping circuits 10. The packets are sent to respective time division multiplexes 12 whose outputs are controlled by a common modulation clock 14 (at 10.125 MHz in the case of satellite channel transmission), the time T assigned to a binary element being then $(1/10.125 \times 10)^{-6}$ seconds.

One of the channels, which will be called channel A, delivers even binary elements $a_{2k}$, whereas the other, which will be called channel B, delivers odd binary elements $a_{2k+1}$, alternating with the even binary elements $a_{2k}$.

The first operation consists in precoding so as to use, at reception, frequency or differential demodulation. In the case of FIG. 1, precoding is intended to transform the state modulation of elements a into modulation by transition between phase states. It is effected between the carriers I and Q, but independent precoding on each carrier would be possible, provided that coherent demodulation is used, which requires more complex equipment than frequency discrimination or phase differential demodulation.

It will be assumed in what follows that binary elements $a_{2k}$ and $a_{2k+1}$ are delivered simultaneously by the multiplexers 12. Channel A comprises an adder 16A to which are applied $a_{2k}$ and the output of the adder 16b of channel B through an element 18 providing a delay T.

The output $\alpha_{2k}$ of 16A is therefore, if the output of 16B at the same moment is designated by $\alpha_{2k+1}$:

$$\alpha_{2k}=a_{2k}\oplus\alpha_{2k-1} \qquad (1)$$

The adder 16B receives $a_{2k+1}$ and the output $\alpha_{2k}$ so that $$\alpha_{2k+1}=a_{2k+1}\oplus\alpha_{2k} \qquad (2)$$

The adder 16A drives directly a symmetric non return to zero/return to zero converter 20A which may be of any known type. Adder 16B, drives a symmetrical NRZ/RZ 20B converter, but through an inverter 22 and an element 24 providing a delay T/2, so as to provide a shift such that the symbols will be applied alternately to the carrier.

The modulation properly speaking is achieved in a conventional way: the 10.125 MHz carrier C, supplied by an oscillator 26, is applied directly to the modulator 28A of channel A and through a phase shifter 30 (causing a phase shift equal to $\pi/2$), to the modulator 28B of channel B. Finally, the two modulated components I and Q of the carrier are combined in an adder 32 which is connected to a conventional transmission circuit 9.

It can be seen that the circuits deliver the phase state transitions $\Delta\phi$ from the states of the binary elements a as shown in the table:

| $\alpha_{2k}$ | $\alpha_{2K-1}$ | $\Delta\phi$ | $a_{2k+1}$ | $\alpha_{2k}$ | $\Delta\phi$ |
|---|---|---|---|---|---|
| 0 | 1 | $+\pi/2$ | 0 | 1 | $-\pi/2$ |
| 0 | 0 | $-\pi/2$ | 0 | 0 | $+\pi/2$ |
| 1 | 1 | $-\pi/2$ | 1 | 1 | $+\pi/2$ |
| 1 | 0 | $+\pi/2$ | 1 | 0 | $-\pi/2$ | which may be written:

$$[2(\alpha_{2k}+\alpha_{2k-1})-1]\pi/2=(2.a_{2k-1})\pi/2 \text{ (even jumps)} \qquad (3)$$

$$[2(\alpha_{2k+1}+\alpha_{2k})-1]\pi/2=(2.a_{2k+1-1})\pi/2 \text{ (odd jumps)} \qquad (4)$$

Figure 2:
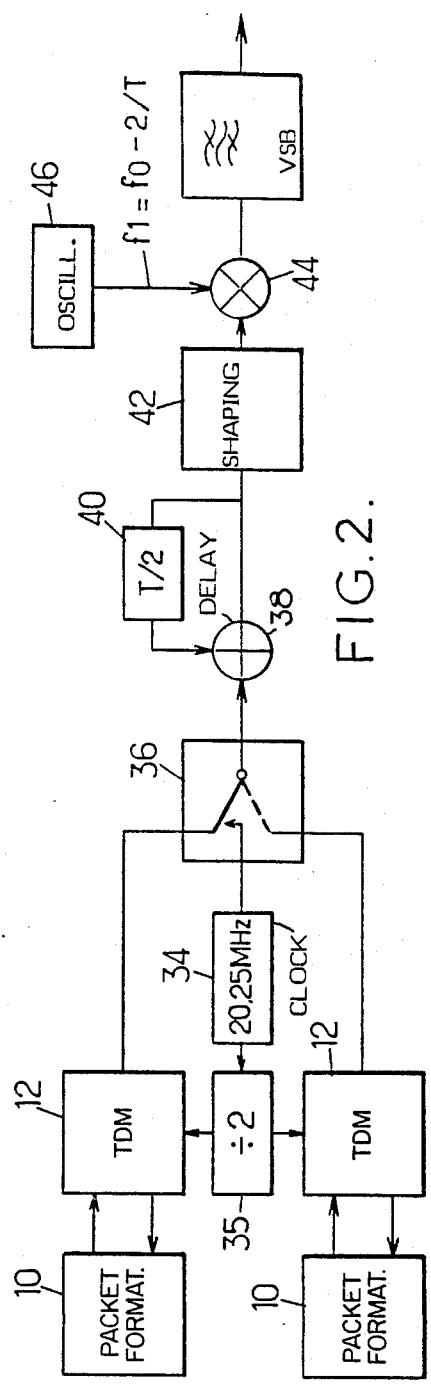
FIG. 2 is a block diagram showing a modification of the modulator of FIG. 1, working in vestigial sideband, designated by the abbreviation VSB.

The variant shown in FIG. 2 achieves MDP 2-4 modulation by vestigial sideband filtering, in a way which is a little simpler than in the case of FIG. 1, but with a 20.25 MHz clock. In FIG. 2, where the elements corresponding to those of FIG. 1 are designated by the same reference number, the time multiplexers 12 receive simultaneously a time base signal at a frequency half the frequency of the clock 34, through a divider 35. The clock frequency is applied directly to a switch 36 for alternately feeding the binary elements coming from one channel and from the other to an input of adder 38.

This input of an adder, with a delay element 40 relooped from the output, forms the precoding circuit. The signal from the adder 38 is also applied to a shaping and symmetrization circuit 42, whose role is similar to that of the NRZ/RZ circuits of FIG. 1. Finally, the output signals of shaping circuit 42 are applied to a modulator 44 which also receives the output of a generator 46 at frequency f1. The modulated carrier is applied to a vestigial sideband filter 48 whose central frequency f0 is related to f1 by the relationship:

$$f1=f0-2/T \qquad (5)$$

The bandwidth of filter 48 must be such that the frequency f1 is elminated for a major part.

The circuit of FIG. 2 has a construction related to that of the modulator described in French document No. 2 428 345 to which reference may be made.

Different usable receivers will now be described, first of all for individual reception. In all cases, the receiver will include elements provided in the D2 MAC-PACKET receivers and a specific assembly. This assembly, intended for demodulation of the signal, may use one or other of several approaches and the choice will be made depending on the desired performances and the price which is estimated acceptable.

Figure 3:
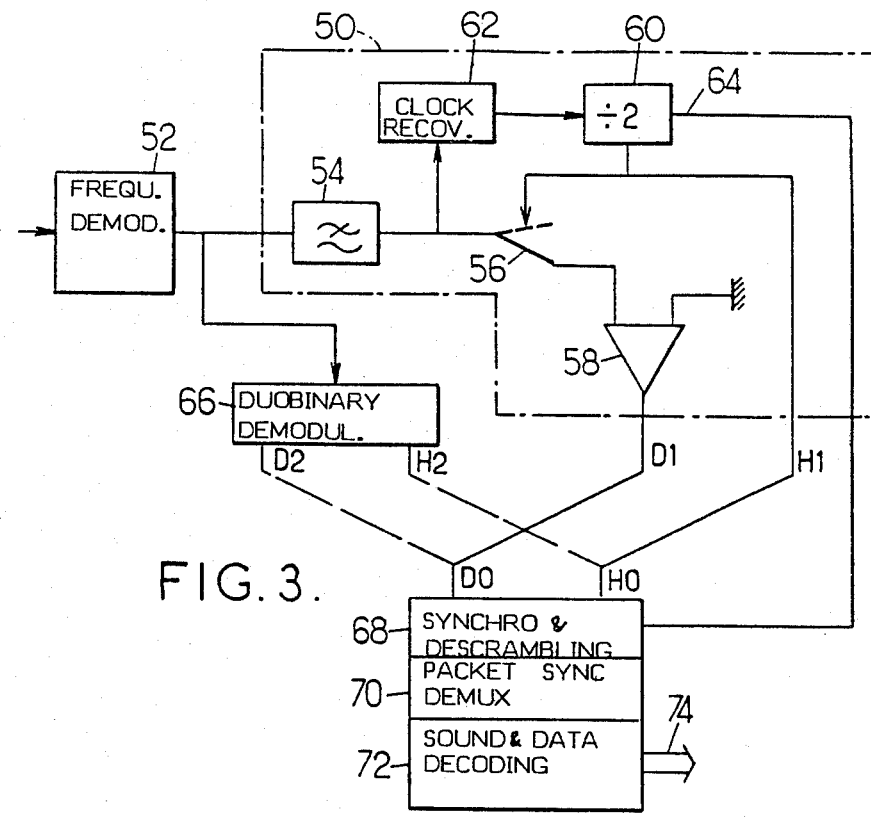
FIG. 3 is a general block diagram showing the frequency demodulation equipment to be added to a conventional D2-MAC/PACKET receiver for receiving one of the full time transmitted multiplexes, this equipment using frequency demodulation, FIGS. 4 and 5, similar to FIG. 3, are also intended for individual reception and use respectively different demodulation and coherent demodulation, FIG. 6, similar to FIGS. 3 to 5, uses coherent demodulation, but for community reception.

FIG. 3 shows a receiver whose specific assembly 50 is provided for receiving the signals from a frequency demodulator 52 which may be of any known type.

The specific assembly 50 includes a low pass filter 54. This input filter 54 is coupled to a multiplex selection switch 56, for applying one binary element out of two to an amplifier comparator 58 so as to ensure physical separation of the multiplexes. Switch 56 is closed at the frequency at which appear symbols belonging to one of the two multiplexes, elaborated by a clock recovery circuit 62 and a divide-by-two divider 60. This divider may be initialized by means of an input 64 for selecting one multiplex or the other.

Thus, at the output of the specific assembly 50, a data signal D1 and a 10.125 MHz clock signal H1 are obtained. The specific equipment is completed by a switch not shown for applying either the D1 and H1 or the outputs D2 and H2 of a conventional D2 MAC/-PACKET duobinary demodulator 66 to the inputs D0 and H0 of an assembly belonging to the normal circuits of a D2 MAC/PACKET receiver. This latter assembly may be regarded as including circuits 68 for the synchronization, unscrambling and identification of the 625 line of the frame, circuits 70 for synchronizing the packets and demultiplexing the packets and circuits 72 for decoding the sound and the data, delivering the restored output 74. A manual switch, not shown, provided in circuits 68 allows the selection order to be delivered to the divider 60.

Figure 4:
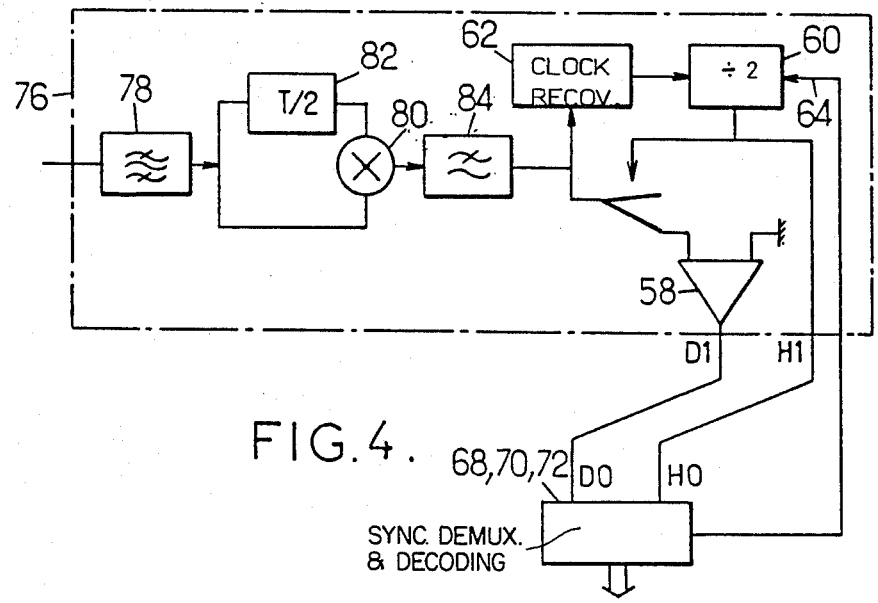

FIG. 4, where only the specific assembly 76 and the circuits 68, 70, 72 have been shown, shows a modification of an individual receiver, this time using differential demodulation. The specific assembly 76 includes an input bandpass filter 78, whose passband is centered on the intermediate frequency F1 of the receiver. The differential demodulator includes a mixer 80 which receives the output of filter 78, on the one hand directly and on the other through an element 82 providing a delay T/2. The output of the mixer 80 is applied to a low pass filter 84. The rest of the specific assembly 76 includes the same elements as those in FIG. 3 designated by the same reference numbers.

It can be seen that the device of FIG. 4 is essentially differentiated from that of FIG. 3 by the addition of the 20.25M bit per second differential demodulator.

Figure 5:
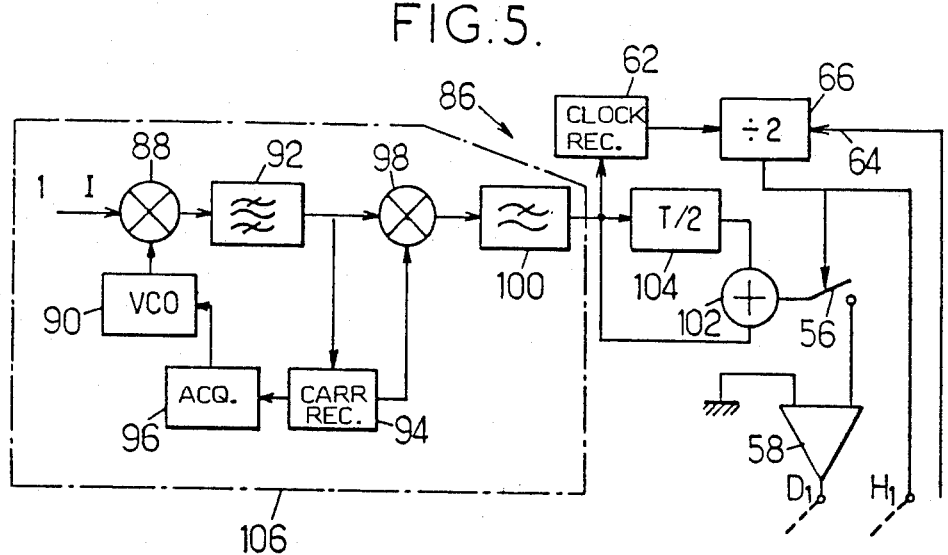

The modification shown in FIG. 5, where the elements corresponding to those already described again bear the same reference number, uses coherent demodulation. This solution is the one which offers the best performances, but on the other hand it leads to the most complex specific assembly 86.

The assembly shown in FIG. 5 includes an input mixer 88 for transmitting the first intermediate frequency, delivered by the conventional stages, not shown, and a controlled local oscillator 90 for passing to the second intermediate frequency. This latter is isolated by a band filter, 92, centered on the second intermediate frequency. The output of filter 92 is applied:

to a carrier recovery circuit 94 which controls the oscillator 90 through an acquisition assistance circuit 96, to a mixer 98 which also receives the carrier recovered by circuit 94.

The output signal of mixer 98 is applied to a low pass filter 100 for recovering the useful signal. Clock recovery and selection of the multiplex to be received are provided as in the case of FIGS. 3 and 4. But the demodulator is of the coherent type and includes an adder 102 which receives at one input the output signal coming directly from the filter 100 and the same signal delayed by T/2 by the element 104 (delay line for example). The rest of the circuit is formed in the same way as in FIGS. 3 and 4.

Whatever embodiment of the receiver is adopted, it can be seen that only the clock recovery circuit operates at 20.25 MHz. All the other functions take place at 10.125 Mbits per second. It can be seen that, by simple bit to bit interlacing of the two D2-PACKET multiplexes, the advantages of the D2 are maintained while obtaining the same capacity as with a C-PACKET system, simply by substituting an oscillator controlled at 20.25 MHz for a 10.125 MHz oscillator. IN all cases also, the specific assembly to be added to a D2 MAC/PACKET receiver is limited to a card which is not very complex and to a switch for passing from normal D2 MAC/PACKET reception to reception of one of the multiplexes broadcast full time over a satellite channel.

The three types of demodulation which have just been described in the case of an individual receiver may also be transposed to the case of a community receiver. For the sake of simplicity, only the case of a coherent demodulation community receiver will be described, where the parts corresponding to those already shown in FIG. 5 are designated by the same reference number.

Figure 6:
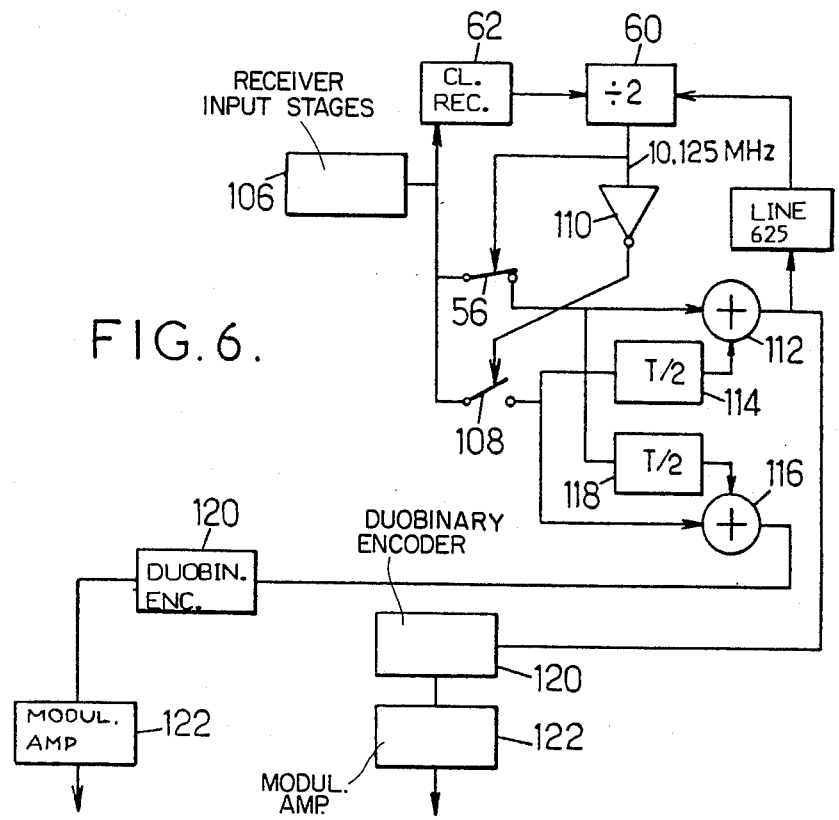

The community receiver must be capable of delivering at two different outputs the two multiplexes present in the transmission channel. The upstream part 106 of the receiver shown in FIG. 6 may be formed in the same way as in FIG. 5. But the demodulator includes two samplers 56 and 108, controlled respectively by the output of divider 60 and by the complement of this output, delivered by an inverter 110.

The output of the first sampler 56 drives directly one of the inputs of an adder 122 whose other input is connected to the output of the other sampler 108 through a delay element 114, providing a delay equal to T/2. Another adder 116 is connected symmetrically with respect to the first one and receives the output of sampler 108 and the output of sampler 56 delayed by T/2 by a second delay element 118. Adders 112 and 116 each drive a power supply chain for individual receivers comprising each time a duobinary coder 120 and modulating and amplifying means 122. Each chain forms a 7 MHz D2-PACKET channel.

Figure 7:
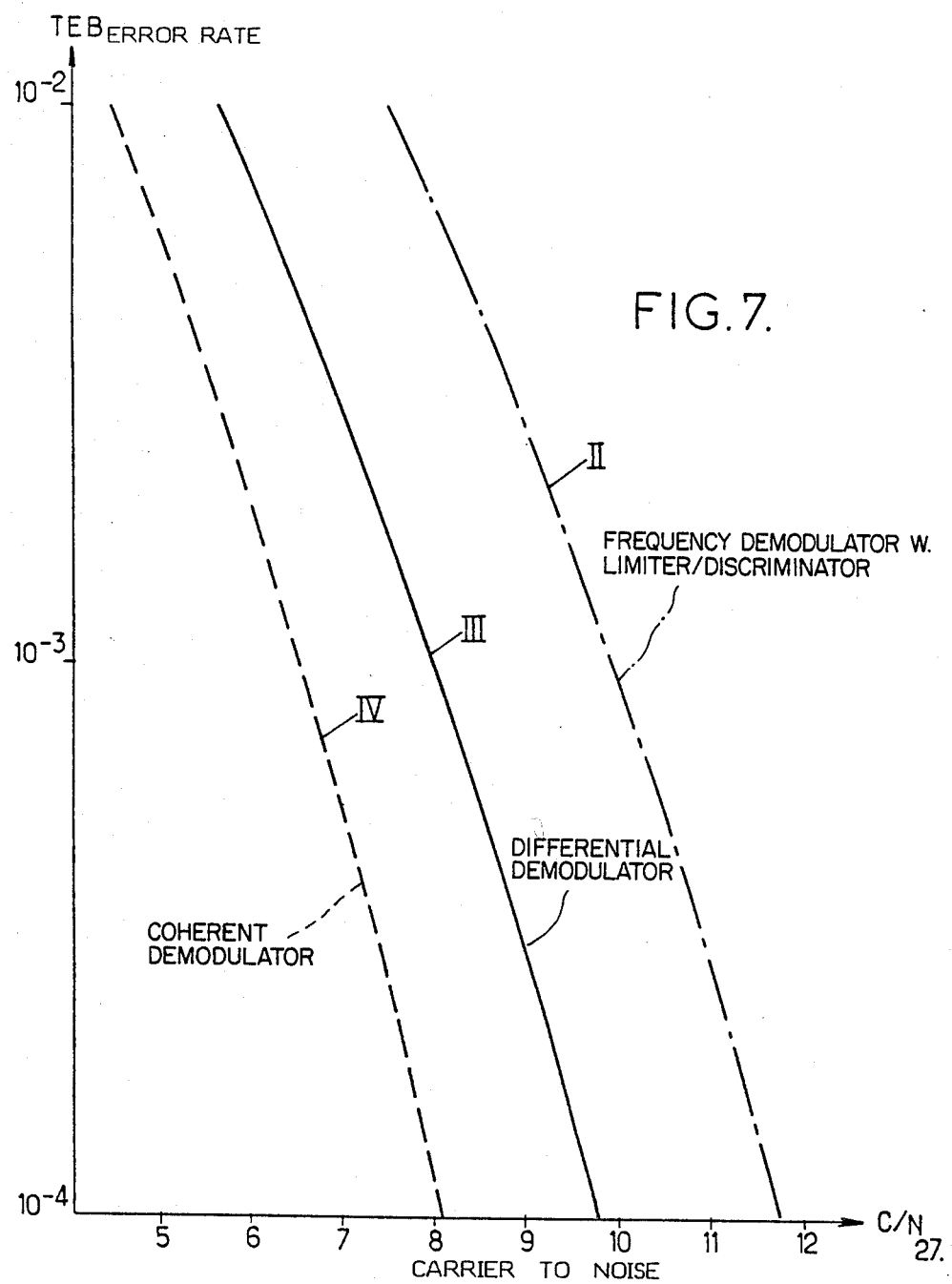
FIG. 7 is a diagram for comparing performances for the three types of demodulation considered above.

The demodulators shown in FIGS. 3 to 5 have slightly different performances which will lead to choosing one or other depending on the desired result and the acceptable price. FIG. 7 shows a variation of these performances in the form of error rates as a function of the signal to noise ratio C/N, for the 27 MHz band.

Curves 2, 3 and 4 correspond respectively to the case of frequency demodulator with limiter-discriminator, a differential demodulator and a coherent demodulator.

I claim:

1. For use in a satellite broadcasting system for transmission over a broadcasting channel having a predetermined frequency bandwidth sufficient for transmission of one TV program in the form of time division multiplexing of image signals in analog form a sound data signals in digital form, a method for full time broadcasting of digital signals in place of said TV program over said channel, comprising the steps of:
    (a) forming two mutually independent multiplexed digital signals each consisting of a stream of bits and each requiring a bandwidth substantially half said predetermined frequency bandwidth, wherein both said multiplexed signals have the same bit rate,
    (b) modulating a same transmitting carrier with said two multiplexed signals with bit-to-bit time interlacing,
    (c) demodulating the multiplexed signals by phase demodulation, phase differential demodulation or phase coherent demodulation, and
    (d) recovering only one of said multiplexed signals by physically separating the respective bits corresponding thereto out of said interlaced bits.

2. A method according to claim 1, further comprising the step of precoding said digital signals before step (b) by transformation from state condition modulation into modulation by transitions between phase states.

3. A method according to claim 2, wherein said step of modulating includes employing PSK 2/4 modulation.

4. A method according to claim 3, including effecting filtering via a vestigial sideband filter subsequent to said step of modulating.

5. A method according to claim 2, wherein said precoding is effected between said quadrature carriers and demodulation is by frequency discrimination or phase difference demodulation.

6. A broadcasting system comprising:
    a transmitter for transmission of a TV program over a broadcasting channel of predetermined bandwidth sufficient for broadcasting according to the D2-MAC/PACKET standard, said transmitter further comprising means for generating full time two mutually independent multiplexed signals in digital form each consisting of a stream of bits and each requiring a bandwidth substantially half the predetermined bandwidth of said broadcasting channel and means for modulating a carrier with said two multiplexed signals and for broadcasting the modulated carrier; and a receiver for controllably receiving either a D2-MAC/PACKET television program from said transmitter or one of said multiplexed signals, said receiver including circuits for receiving D2-MAC/PACKET TV programs comprising a duobinary decoder and means for packet demultiplexing and sound and data decoding, a specific unit having a circuit for recovering a clock signal at a frequency double that of the bits of each multiplexed signal from the stream of bits from said transmitter, means including a divider-by-two for extracting one bit out of two for selective recovery of one of said streams and means for resetting said divider for selection of a particular one of said multiplexed signals and delivering said selected multiplexed signal thereof on an output of said specific unit, and operator operable switch means for the selective substitution of said specific unit for the duobinary decoder of said D2-MAC/PACKET circuits.

7. A receiver according to claim 6, wherein said unit has a frequency demodulator.

8. A receiver according to claim 6, wherein said unit has a differential demodulator.

9. A broadcasting system for community reception comprising:

a transmitter for transmission of a TV program over a broadcasting channel of predetermined bandwidth sufficient for broadcasting according to the C2-MAC/PACKET standard, said transmitter further comprising means for generating full time two mutually independent multiplexed signals in digital form each consisting of a stream of bits and each requiring a bandwidth substantially half the predetermined bandwidth of said broadcasting channel and means for modulating a carrier with said two multiplexed signals and for broadcasting the modulated carrier; and a receiver for controllably receiving either a D2-MAC/PACKET TV program from said transmitter or one of said multiplexed signals, said receiver including:

circuits for receiving D2-MAC/PACKET TV programs comprising a duobinary decoder and means for packet demultiplexing and sound and data decoding;

a specific unit having a circuit for recovering a clock signal at a frequency twice the bit rate of each multiplexed signal from the stream of bits from said transmitter so as to alternately control two sampling switch means for transmitting therethrough the two multiplexed signal, wherein said first sampling switch is directly coupled to an input of a first adder and via a delay circuit to a second input of a second adder and said second sampling switch is directly coupled to a first input of said second adder and to a second input of said first adder via another delay circuit; and a pair of power supply chains for delivering said multiplexed signals, each chain including a series connection of a duobinary coder and a modulator-amplifier.

* * * * *

UNITED STATES PATENT AND TRADEMARK OFFICE
CERTIFICATE OF CORRECTION

PATENT NO. : 4,821,261

DATED : April 11, 1989

INVENTOR(S) : Daniel Pommier

It is certified that error appears in the above-identified patent and that said Letters Patent is hereby corrected as shown below:

Title page, left-hand column, after "[73] Assignee:", "Etat Francais, Establissement Public de Telediffusion" should instead read -- ETAT FRANCAIS, represente par le Secretariat d'Etat aux Postes et Telecommunications (CENTRE NATIONAL d'ETUDES DES TELECOMMUNICATIONS), Issy-les-Moulineaux, France; ETABLISSEMENT PUBLIC DE TELEDIFFUSION dit "TELEDIFFUSION DE FRANCE"--

Signed and Sealed this

Third Day of October, 1989

Attest:

DONALD J. QUIGG

Attesting Officer

Commissioner of Patents and Trademarks